United States Patent
Wang et al.

(10) Patent No.: US 9,931,742 B2
(45) Date of Patent: Apr. 3, 2018

(54) JIG FOR DETACHING DISPLAY ASSEMBLY

(71) Applicants: BOE Technology Group Co., Ltd., Beijing (CN); Hefei BOE Optoelectronics Technology Co., Ltd., Anhui (CN)

(72) Inventors: Gang Wang, Beijing (CN); Xinqing Zhu, Beijing (CN); Guangyuan Cai, Beijing (CN); Jianlei Yang, Beijing (CN); Yu Zhang, Beijing (CN); Ningheng Du, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 287 days.

(21) Appl. No.: 14/744,215

(22) Filed: Jun. 19, 2015

(65) Prior Publication Data
US 2016/0074979 A1    Mar. 17, 2016

(30) Foreign Application Priority Data

Sep. 11, 2014  (CN) .......................... 2014 1 0461285

(51) Int. Cl.
  *B25B 27/00* (2006.01)
  *B29B 17/00* (2006.01)
  *B09B 5/00* (2006.01)

(52) U.S. Cl.
  CPC ................ *B25B 27/00* (2013.01); *B09B 5/00* (2013.01); *B29B 17/00* (2013.01)

(58) Field of Classification Search
  CPC ..... B25B 27/00; B25B 27/0028; B29B 17/00; B09B 5/00
  See application file for complete search history.

(56) References Cited

U.S. PATENT DOCUMENTS

2009/0162471 A1*  6/2009  Ijiri ..................... B29C 45/2608
                                                          425/405.1

FOREIGN PATENT DOCUMENTS

| CN | 202097710 U |   | 1/2012 |
|----|-------------|---|--------|
| CN | 202241097 U |   | 5/2012 |
| CN | 103302631 A |   | 9/2013 |
| CN | 203371469 U | * | 1/2014 |
| CN | 103659154 A |   | 3/2014 |
| CN | 203611195 U |   | 5/2014 |
| CN | 203679654 U |   | 7/2014 |

(Continued)

OTHER PUBLICATIONS

First Office Action, including Search Report, for Chinese Patent Application No. 201410461285.9, dated Sep. 2, 2015, 8 pages.

(Continued)

*Primary Examiner* — Carl Arbes
(74) *Attorney, Agent, or Firm* — Westman, Champlin & Koehler, P.A.

(57) ABSTRACT

An embodiment of the present invention provides a jig for detaching a display assembly. The display assembly comprises: a fixing module configured to fix a backlight module in the display assembly; and an absorbing module configured to absorb a display panel in the display assembly such that the display panel and the backlight module are separated from each other by an external force.

18 Claims, 3 Drawing Sheets

(56) References Cited

FOREIGN PATENT DOCUMENTS

JP       2008-304844 A     12/2008
JP       2011-186403 A      9/2011

OTHER PUBLICATIONS

Second Office Action, including Search Report, for Chinese Patent Application No. 201410461285.9, dated May 16, 2016, 11 pages.

* cited by examiner

JIG FOR DETACHING DISPLAY ASSEMBLY

CROSS-REFERENCE TO RELATED APPLICATION

This application claims the benefit of Chinese Patent Application No. 201410461285.9 filed on Sep. 11, 2014 with the State Intellectual Property Office of China, the whole disclosure of which is incorporated herein by reference.

BACKGROUND OF THE INVENTION

Field of the Invention

The present disclosure relates to the field of a display technique, in particular, relates to a jig for detaching a display assembly.

Description of the Related Art

A display assembly includes a backlight module and a display panel. The backlight module and the display panel are stuck to each other by a sealant at four sides thereof. At present, the backlight module and the display panel in the display assembly are typically recycled to reduce the manufacturing cost.

A major problem for recycling the backlight module and the display panel in the display assembly is how to detach the display assembly successfully to achieve the separation of the backlight module from the display panel. In the prior art, the backlight module and the display panel are separated from each other mainly by hands directly. However, during such separation, the display panel will be subject to non-uniform forces and thus it is easy to cause issues such as breakdown or crack. At the same time, issues of the backlight module such as deformation, film displacement tend to occur, causing a low success chance of detaching the display assembly.

SUMMARY OF THE INVENTION

The technical problem to be solved in the present disclosure is to provide a jig for detaching a display assembly which may improve the success chance of detaching the display assembly efficiently.

In accordance with an aspect of the present invention, it provides a jig for detaching a display assembly, comprising: a fixing module configured to fix a backlight module in the display assembly; and an absorbing module configured to absorb a display panel in the display assembly such that the display panel and the backlight module are separated from each other by an external force.

In an example, the absorbing module comprises a body part, a handle arranged on the body part and a plurality of suction cups distributed on the body part.

In an example, the body part has a shape of combination of two rectangles in juxtaposition adjoining each other, the handle and the suction cups being located on two opposed sides of the body part, the handle being connected with two short fringes of the body part on one of the two sides, the plurality of suction cups being nine suction cups distributed uniformly on the other side of the body part.

In an example, the fixing module comprises: an edge fixing portion configured to fix an edge region of the backlight module; and an intermediate fixing portion configured to fix an intermediate region of the backlight module.

In an example, the edge fixing portion comprises a first fixing unit, a second fixing unit, a third fixing unit and a fourth fixing unit, and wherein the first fixing unit and the second fixing unit are configured to fix two opposed lateral sides of the backlight module and the third fixing unit and the fourth fixing unit are configured to fix two corners of the backlight module.

In an example, the first fixing unit, the second fixing unit, the third fixing unit and the fourth fixing unit are provided with grooves to be inserted with the edges of the backlight module.

In an example, one or both of the first fixing unit and the second unit comprise(s) a contact portion configured to fix the edge of the backlight module and an elastic portion which is connected with the contact portion and is able to generate elastic deformation in a direction perpendicular to the lateral sides of the backlight module.

In an example, the elastic portion comprises a spring and the grooves are located on the contact portion.

In an example, the third fixing unit and the fourth fixing unit are configured to fix corners formed by one lateral side of the backlight module and two lateral sides fixed by the first fixing unit and the second fixing unit.

In an example, the intermediate fixing portion comprises a plurality of U-shaped grooves, two adjacent U-shaped grooves having openings in opposite directions, and wherein the location at which a symmetrical axis of each of the U-shaped grooves is located is provided with a through hole configured to discharge air in the U-shaped grooves.

In an example, the plurality of U-shaped grooves are six U-shaped grooves arranged in one row parallel to each other.

In an example, the jig for detaching a display assembly further comprises a heating module configured to heat a sealant in the display assembly.

In an example, the jig for detaching a display assembly further comprises a support module on which the fixing module is fixed.

In an example, the jig for detaching a display assembly further comprises a support module on which the heating module and the fixing module are fixed.

In an example, the heating module comprises four heating portions, each two of which are opposed to each other, the heating portions comprising heating units each of which is provided with a T-shaped longitudinal section and a thermal insulation unit located at recess positions on two sides of the heating portions.

In an example, the heating unit is located at the intermediate position of the sealant on four sides.

In an example, the heating unit comprises an aluminum housing and a heating tube located in the aluminum housing.

In an example, the thermal insulation unit is a thermal insulation stone.

An embodiment of the present invention provides a jig for detaching a display assembly, comprising a fixing module configured to fix a backlight module in the display assembly and an absorbing module configured to absorb a display panel in the display assembly such that the display panel and the backlight module are separated from each other by an external force. During detaching the display assembly using the above jig, on one hand, as the fixing module fixes the backlight module, the backlight module will not be moved during detaching the display assembly so as to reduce the deformation of the backlight module and the displacement of films in the backlight module; on the other hand, as the absorbing module is absorbed uniformly to the entire display panel, when the absorbing module is subject to an external force to detach the display assembly to separate the display panel from the backlight module, the entire display panel is subject to uniform force such that the breakdown or crack of the display panel may be reduced. In this way, it may improve the success chance of detaching the display assembly efficiently.

BRIEF DESCRIPTION OF THE DRAWINGS

The embodiments of the present invention will be more apparent after reading the following explanations for drawings. It should be noted that the following drawings are given only by way of examples. The skilled person in the art may apparently envisage other drawings from these drawings, without any creative labor.

Figure 1:
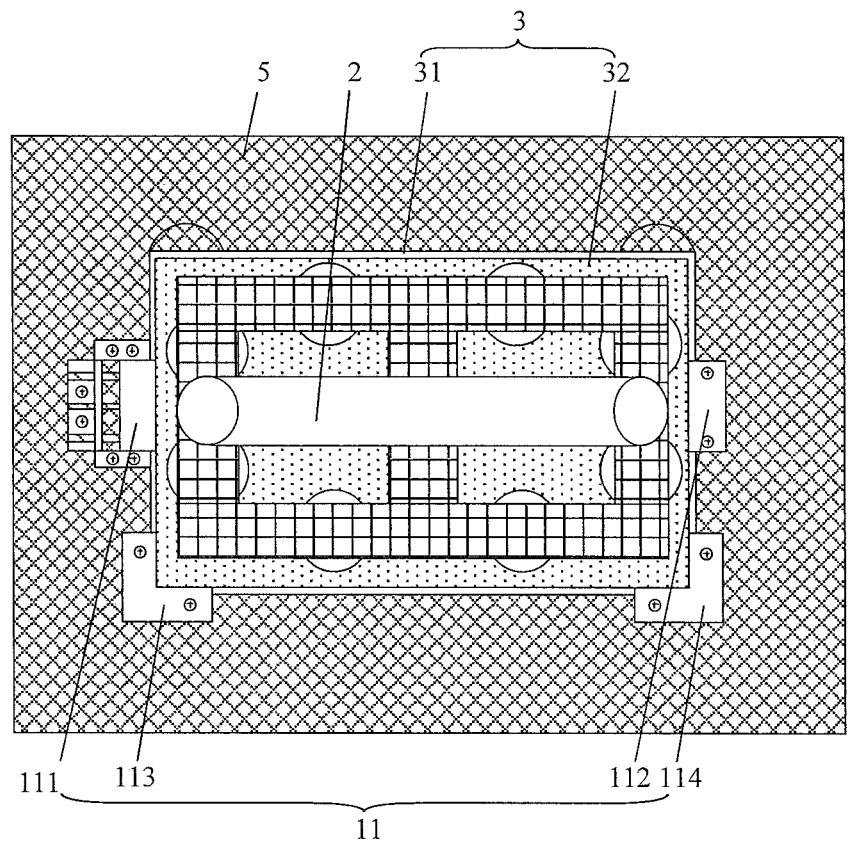
FIG. 1 schematically shows a jig for detaching a display assembly according to an embodiment of the present invention.

| Explanation of Reference Numerals | | |
|---|---|---|
| 11: edge fixing portion | 111: first fixing unit | 1111: contact portion |
| 1112: elastic portion | 112: second fixing unit | 113: third fixing unit |
| 114: fourth fixing unit | 12: intermediate fixing portion | 121: U-shaped groove |
| 1211: through hole | 2: absorbing module | 21: body part |
| 22: handle | 23: suction cup  3: display assembly | 31: backlight module |
| 32: display panel | 4: heating module | 41: heating unit |
| 42: thermal insulation unit | 5: support module | |

DETAILED DESCRIPTION OF PREFERRED EMBODIMENTS OF THE INVENTION

Exemplary embodiments of the present disclosure will be described clearly and entirely with reference to the attached drawings. Apparently, the embodiments are only given by way of examples, instead of all of embodiments of the present invention. From these embodiments, all of other embodiments that can be envisaged apparently by the skilled person in the art will fall within the scope of the present disclosure.

An embodiment of the present invention provides a jig for detaching a display assembly that can efficiently improve the success chance of detaching the display assembly.

As illustrated in FIG. 1, the jig for detaching the display assembly includes: a fixing module (not marked) configured to fix a backlight module 31 in the display assembly 3; and an absorbing module 2 configured to absorb a display panel 32 in the display assembly 3 such that the display panel 32 and the backlight module 31 are separated from each other by an external force.

When the above jig is used to detach the display assembly 3, on one hand, as the fixing module fixes the backlight module 31, the backlight module 31 will not be moved during detaching the display assembly 3, so as to reduce the deformation of the backlight module 31 and the displacement of films in the backlight module 31; on the other hand, as the absorbing module 2 is absorbed uniformly to the entire display panel 32, when the absorbing module 2 is subject to an external force for detaching the display assembly 3 to separate the display panel 32 from the backlight module 31, the entire display panel 32 is subject to uniform force such that the breakdown or crack of the display panel 32 may be reduced. In this way, it may improve the success chance of detaching the display assembly efficiently.

Figure 2:
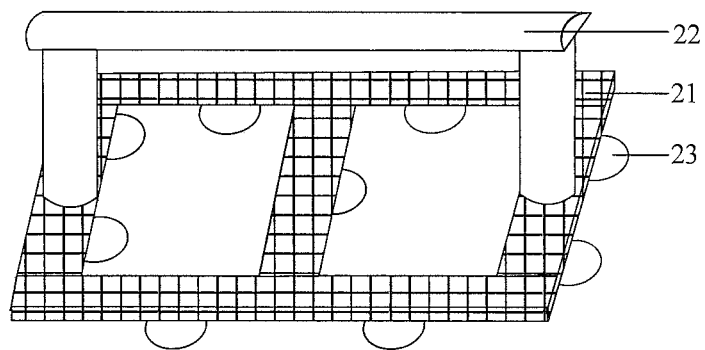
FIG. 2 schematically shows in a perspective view an absorbing module according to an embodiment of the present invention.

In an example, as illustrated in FIGS. 1-2, the absorbing module 2 includes a body part 21, a handle 22 connected with two short fringes of the body part 21 and nine suction cups 23 distributed uniformly on the body part 21. The body part 21 has a shape of combination of two rectangles in juxtaposition adjoining each other. As shown, the handle 22 and the suction cups 23 are located on the top side and the bottom side of the body part 21 respectively.

Figure 3:
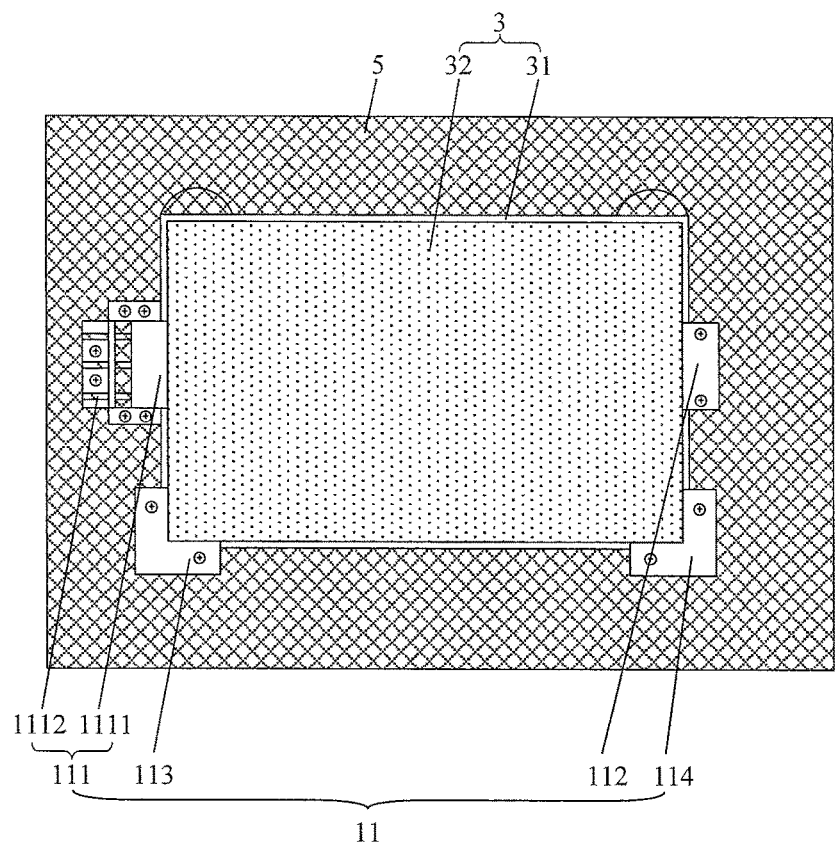
FIG. 3 schematically shows an edge fixing portion and a support module in the jig according to an embodiment of the present invention.
Figure 4:
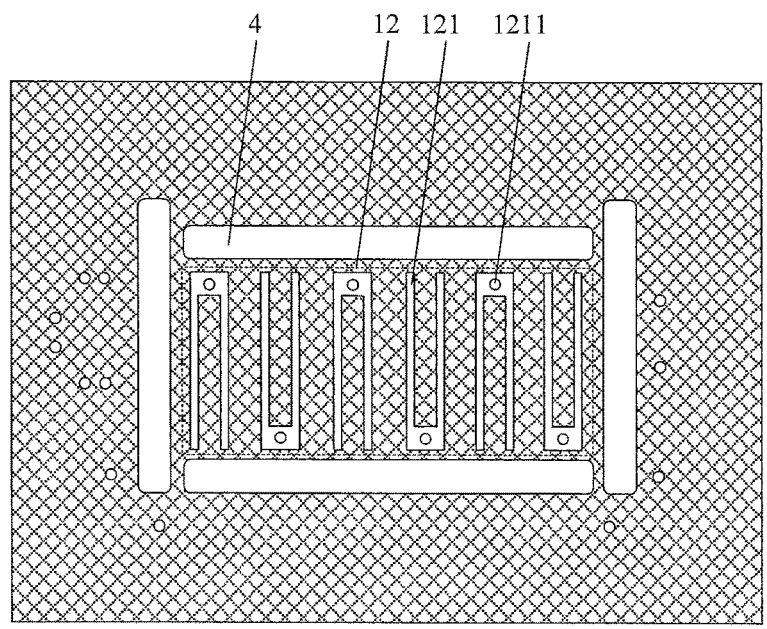
FIG. 4 schematically shows an intermediate absorbing portion, a support module and a heating module in the jig according to an embodiment of the present invention.

As illustrated in FIGS. 3-4, the fixing module includes: an edge fixing portion 11 configured to fix an edge region of the backlight module 31; and an intermediate fixing portion 12 configured to fix an intermediate region of the backlight module 31. In this way, it may prevent deformation in the edge region and the intermediate region of the backlight module 31 during detaching the display assembly 3.

The specific structures of the edge fixing portion 11 and the intermediate fixing portion 12 will be explained in detail below.

As illustrated in FIG. 3, the edge fixing portion 11 and the intermediate portion 12 are both fixed to a support module 5. Certainly, the skilled person in the art may also fix them by other means, which are not intended to be limited in the present disclosure.

The edge fixing portion 11 includes a first fixing unit 111, a second fixing unit 112, a third fixing unit 113 and a fourth fixing unit 114. The first fixing unit 111 and the second fixing unit 112 are configured to fix two opposed lateral sides of the backlight module 31. The third fixing unit 113 and the fourth fixing unit 114 are configured to fix two corners of the backlight module 31. As an example, the third fixing unit 113 and the fourth fixing unit 114 have L-shaped cross sections. Preferably, the third fixing unit 113 and the fourth fixing unit 114 are configured to fix corners formed by one lateral side of the backlight module 31 and two lateral sides fixed by the first fixing unit 111 and the second fixing unit 112. Certainly, the fixing positions of the first, second, third and fourth fixing units 111, 112, 113 and 114 may be provided as required, instead of being limited to the cases shown in the figures.

In this way, the display assembly 3 may be inserted into the jig from an end at which the fixing module is not provided.

In a further embodiment, preferably, the first fixing unit 111, the second fixing unit 112, the third fixing unit 113 and the fourth fixing unit 114 are provided with grooves inserting with the edges of the backlight module 31, as the backlight module 31 in the display assembly 3 has a size greater than the size of the display panel 32. It should be noted that the edge of the backlight module 31 is meant to the region of the backlight module 31 beyond the display panel 32. The size of the grooves may be set on the basis of the thickness of the backlight module 31 and the size difference between the backlight module 31 and the display panel 32 in practice, such that the edge of the backlight module 31 is just located in the grooves when the display assembly 3 is inserted into the jig.

In a further embodiment, due to limitation of production process, there is a dimensional error within a certain range occurring during producing the display assembly. In order that the jig for detaching the display assembly provided by the embodiment of the present invention can detach the display assembly 3 with a certain dimensional error, as illustrated in FIG. 3, in an embodiment of the present invention, preferably, the first fixing unit 111 includes a contact portion 1111 configured to fix the edge of the backlight module 31 and an elastic portion 1112 which is connected with the contact portion 1111 and is able to generate elastic deformation in a direction perpendicular to the lateral sides of the backlight module 31. The grooves are arranged on the contact portion 1111. As an example, the elastic portion 1112 includes a spring. Herein, FIG. 3 only shows the first fixing unit 111 has the above arrangement, however, the second fixing unit 112 may also be arranged to have the same arrangement as that of the first fixing unit 111. The skilled person in the art can select whether the second fixing unit 112 has the same arrangement as that of the first fixing unit 111 as required.

As illustrated in FIG. 4, the intermediate fixing portion 12 includes six U-shaped grooves 121 arranged in one row parallel to each other. Two adjacent U-shaped grooves 121 have openings in opposite directions. A through hole 1211 is provided at a location at which a symmetrical axis of each of the U-shaped grooves 121 is located, and configured to discharge air in the U-shaped grooves 121. Illustratively, the through hole 1211 can be connected with a vacuum pump, through which the air in the U-shaped grooves 121 is discharged. Herein, the arrangement of the U-shaped grooves 121 is not limited to the cases shown. It is given only by way of examples. The skilled person in the art may select it as required.

Further, as the backlight module 31 and the display panel 32 are stuck to each other by surrounding a sealant or a sealant at four sides thereof, as illustrated in FIG. 4, the jig for detaching a display assembly according to the embodiment further includes a heating module 4 configured to heat the sealant in the display assembly 3. The viscosity of the sealant or the seal adhesive is reduced in the heating operation, so as to further improve the success chance of detaching the display assembly 3.

Figure 5:
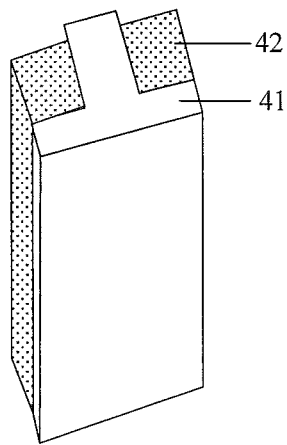
FIG. 5 schematically shows in a perspective view a heating portion according to an embodiment of the present invention.

In an example, as illustrated in FIG. 4, the heating module 4 includes four heating portions, each two of which are opposed to each other. The heating portions are located at the intermediate positions of the sealant on four sides. And the heating portions should evade integrated circuits provided in the display panel 32 to prevent the integrated circuits from being degraded by heat generated by the heating portions. Preferably, as illustrated in FIG. 5, the heating portions include heating units 41 each of which is provided with T-shaped longitudinal section and a thermal insulation unit 42 located at recess positions on two sides of the heating units 41. The heating unit 41 includes an aluminum housing and a heating tube located in the aluminum housing. The thermal insulation unit 42 is preferably a thermal insulation stone. In this case, the heating units 41 are located at the intermediate positions of the sealant on four sides.

In addition, for the sake of convenience, as illustrated in FIGS. 1, 3 and 4, the jig for detaching a display assembly in an embodiment of the present invention further includes a support module 5 on which the fixing module is fixed. As an example, the fixing module is fixed on the support module 5 by a screw. Further, the heating module 4, the edge fixing portion 11 and the intermediate fixing portion 12 are also fixed on the support module 5.

An embodiment of the present invention provides a jig for detaching a display assembly, comprising: a fixing module configured to fix a backlight module in the display assembly; and an absorbing module configured to absorb a display panel in the display assembly such that the display panel and the backlight module are separated from each other by an external force. During detaching the display assembly using the above jig, on one hand, as the fixing module fixes the backlight module, the backlight module will not be moved during detaching the display assembly so as to reduce the deformation of the backlight module and the displacement of films in the backlight module; on the other hand, as the absorbing module is absorbed uniformly to the entire display panel, when the absorbing module is subject to an external force for detaching the display assembly to separate the display panel from the backlight module, the entire display panel is subject to uniform force such that the breakdown or crack of the display panel may be reduced. In this way, it may improve the success chance of detaching the display assembly efficiently.

Although several exemplary embodiments have been shown and described, the present invention is not limited to those and it would be appreciated by those skilled in the art that various changes, equivalents or modifications may be made in these embodiments without departing from the principles and spirit of the disclosure, the scope of which is defined in the claims and their equivalents.

What is claimed is:

1. A jig for detaching a display assembly comprising a backlight module and a display panel fixed together by sealant, comprising:
    a fixing module configured to fix the backlight module in the display assembly; and
    an absorbing module configured to absorb a display panel in the display assembly such that the display panel and the backlight module are separated from each other by an external force,
    wherein the fixing module comprises:
        an edging fixing portion configured to fix an edge region of the backlight module; and
        an intermediate fixing portion configured to fix an intermediate region of the backlight module,
        wherein the edge fixing portion comprises a first fixing unit, a second fixing unit, a third fixing unit and a fourth fixing unit, and wherein the first fixing unit and the second fixing unit are configured to fix two opposed lateral sides of the backlight module, and the third fixing unit and the fourth fixing unit are configured to fix two corners of the backlight module.

2. The jig for detaching a display assembly according to claim 1, wherein the absorbing module comprises a body part, a handle arranged on the body part and a plurality of suction cups distributed on the body part.

3. The jig for detaching a display assembly according to claim 2, wherein the body part has a shape of combination of two rectangles in juxtaposition adjoining each other, the handle and the suction cups being located on two opposed sides of the body part, the handle being connected with two short fringes of the body part on one of the two sides, the plurality of suction cups being nine suction cups distributed uniformly on the other side of the body part.

4. The jig for detaching a display assembly according to claim 3, wherein the fixing module comprises:
   an edge fixing portion configured to fix an edge region of the backlight module; and
   an intermediate fixing portion configured to fix an intermediate region of the backlight module.

5. The jig for detaching a display assembly according to claim 1, wherein the first fixing unit, the second fixing unit, the third fixing unit and the fourth fixing unit are provided with grooves to be inserted with the edges of the backlight module.

6. The jig for detaching a display assembly according to claim 5, wherein one or both of the first fixing unit and the second unit comprise(s) a contact portion configured to fix the edge of the backlight module and an elastic portion which is connected with the contact portion and is able to generate elastic deformation in a direction perpendicular to the lateral sides of the backlight module.

7. The jig for detaching a display assembly according to claim 6, wherein the elastic portion comprises a spring and the grooves are located on the contact portion.

8. The jig for detaching a display assembly according to claim 6, wherein the third fixing unit and the fourth fixing unit are configured to fix corners formed by one lateral side of the backlight module and two lateral sides fixed by the first fixing unit and the second fixing unit.

9. The jig for detaching a display assembly according to claim 1, wherein the intermediate fixing portion comprises a plurality of U-shaped grooves, two adjacent U-shaped grooves having openings in opposite directions, and wherein the location at which a symmetrical axis of each of the U-shaped grooves is located is provided with a through hole configured to discharge air in the U-shaped grooves.

10. The jig for detaching a display assembly according to claim 9, wherein the plurality of U-shaped grooves are six U-shaped grooves arranged in one row parallel to each other.

11. The jig for detaching a display assembly according to claim 1, further comprising a heating module configured to heat a sealant in the display assembly.

12. The jig for detaching a display assembly according to claim 1, further comprising a heating module configured to heat a sealant in the display assembly.

13. The jig for detaching a display assembly according to claim 1, further comprising a support module on which the fixing module is fixed.

14. The jig for detaching a display assembly according to claim 12, further comprising a support module on which the heating module and the fixing module are fixed.

15. The jig for detaching a display assembly according to claim 14, wherein the heating module comprises four heating portions, each two of which are opposed to each other, the heating portions comprising heating units each of which is provided with a T-shaped longitudinal section and a thermal insulation unit located at recess positions on two sides of the heating portions.

16. The jig for detaching a display assembly according to claim 15, wherein the heating unit is located at the intermediate position of the sealant on four sides.

17. The jig for detaching a display assembly according to claim 15, wherein the heating unit comprises an aluminum housing and a heating tube located in the aluminum housing.

18. The jig for detaching a display assembly according to claim 15, wherein the thermal insulation unit is a thermal insulation stone.

* * * * *